(12) United States Patent
Muzaffar et al.

(10) Patent No.: US 10,263,765 B2
(45) Date of Patent: Apr. 16, 2019

(54) SYSTEMS AND METHODS FOR LOW-POWER SINGLE-WIRE COMMUNICATION

(71) Applicant: Khalifa University of Science and Technology, Abu Dhabi (AE)

(72) Inventors: Shahzad Muzaffar, Abu Dhabi (AE); Jerald Yoo, Singapore (SG); Ibrahim M. Elfadel, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 0 days.

(21) Appl. No.: 15/807,854

(22) Filed: Nov. 9, 2017

(65) Prior Publication Data

US 2018/0131505 A1  May 10, 2018

Related U.S. Application Data

(60) Provisional application No. 62/419,493, filed on Nov. 9, 2016.

(51) Int. Cl.
*H04L 7/04* (2006.01)
*H04L 7/00* (2006.01)
*H04B 1/7107* (2011.01)
*H04L 25/49* (2006.01)

(52) U.S. Cl.
CPC ....... *H04L 7/0091* (2013.01); *H04B 1/71075* (2013.01); *H04L 7/041* (2013.01); *H04L 7/048* (2013.01); *H04L 25/4902* (2013.01); *H04L 25/4915* (2013.01)

(58) Field of Classification Search
USPC ................................ 704/206, 500
See application file for complete search history.

(56) References Cited

U.S. PATENT DOCUMENTS

| | | | | |
|---|---|---|---|---|
| 2009/0281811 | A1* | 11/2009 | Oshikiri | G10L 19/0208 704/500 |
| 2014/0214411 | A1* | 7/2014 | Daimou | G10L 19/0212 704/206 |
| 2017/0309287 | A1* | 10/2017 | Lee | G10L 19/26 |

OTHER PUBLICATIONS

Muzaffar, S., et al., "A Pulsed-Index Technique for Single-Channel, Low-Power, Dynamic Signaling," 2015 Design, Automation & Test in Europe Conference & Exhibition (Date), Mar. 9-13, 2015, Grenoble, France, 6 pages.

* cited by examiner

*Primary Examiner* — Eva Y Puente
(74) *Attorney, Agent, or Firm* — Withrow & Terranova, P.L.L.C.

(57) ABSTRACT

Systems and methods for low-power single-wire communication are provided. In some embodiments, a method of operation of a transmitter to transmit a data word to a receiver using low-power single-wire communication includes receiving the data word to be transmitted to the receiver. The method also includes encoding the data word to be transmitted in a Pulsed Index Communication (PIC) format to produce a PIC data word and transmitting the PIC data word to the receiver. In this way, the transmitter may be able to transmit an increased amount of data while maintaining a simple communication protocol that uses low power and does not require a Clock-Data Recovery circuit.

18 Claims, 14 Drawing Sheets

PULSES = 12

| 0 | 1 | 0 | 0 | 0 | 1 | 1 | 0 |
|---|---|---|---|---|---|---|---|
| 8 | 7 | 6 | 5 | 4 | 3 | 2 | 1 |

| 1 | | 1 | 1 |
|---|---|---|---|
| 7 | | 3 | 2 |

FIG. 2A

PULSES = 136

| 0 | 0 | 0 | 0 | 1 | 1 | 1 | 0 | 0 | 1 | 1 | 0 | 0 | 1 | 1 | 1 |
|---|---|---|---|---|---|---|---|---|---|---|---|---|---|---|---|
| 16 | 15 | 14 | 13 | 12 | 11 | 10 | 9 | 8 | 7 | 6 | 5 | 4 | 3 | 2 | 1 |

FIG. 2B

| PULSES | INVERTED | REVERSED |
|---|---|---|
| 1 | NO | YES |
| 2 | YES | NO |
| 3 | YES | YES |
| 4 | NO | NO |

FLAGS

FIG. 6

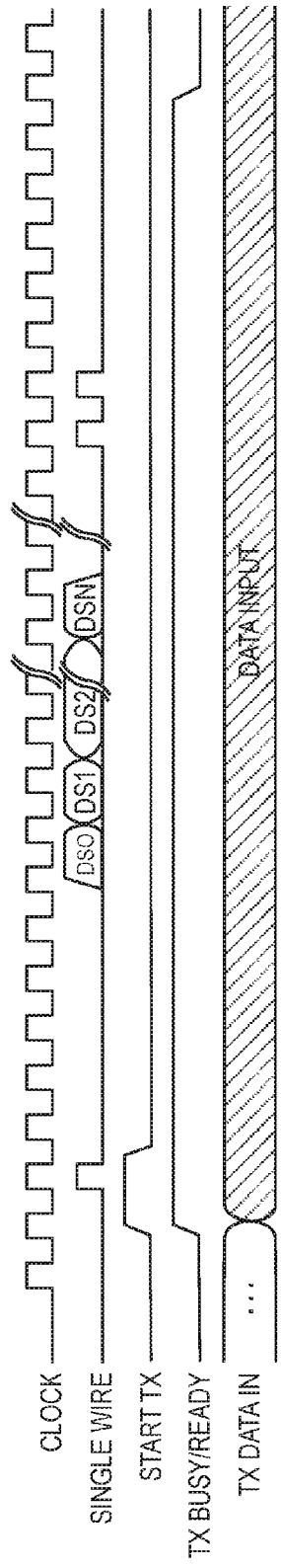
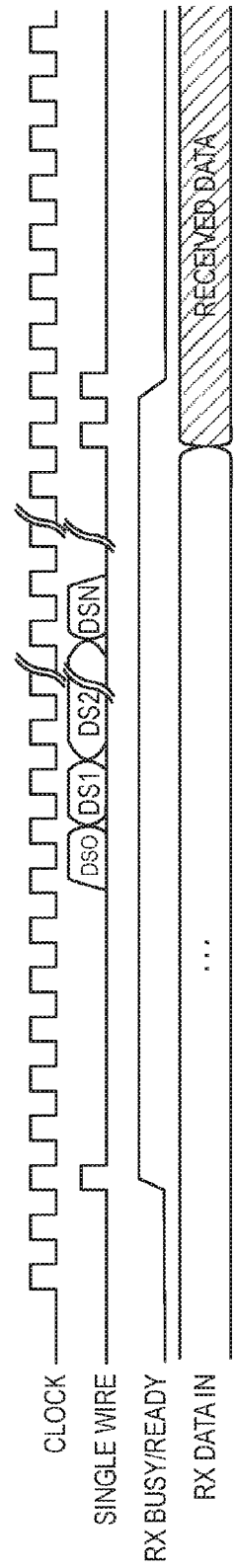
FIG. 12A
FIG. 12B
FIG. 12C

SYSTEMS AND METHODS FOR LOW-POWER SINGLE-WIRE COMMUNICATION

RELATED APPLICATIONS

This application claims the benefit of provisional patent application Ser. No. 62/419,493, filed Nov. 9, 2016, the disclosure of which is hereby incorporated herein by reference in its entirety.

FIELD OF THE DISCLOSURE

The present disclosure relates generally to single-wire communication and specifically to modulation and coding schemes.

BACKGROUND

The most common operation of an Internet-of-Things (IoT) sensor is short activity bursts separated by long time intervals in sleep or listen modes. During the data bursts, sensed information has to be reliably communicated in real time without draining the energy resources of the sensor node. One way to save such resources is to efficiently code the data burst, use single-channel communication, and adopt ultra-low-power communication circuit techniques.

Typical networks use a single-wire protocol that does not require any Clock and Data Recovery (CDR) circuit. These devices are powered using the charge of a capacitor and their power requirements are quite minimal. The networks using this architecture are called Microlans and have been applied in a variety of sensor applications. The main disadvantage of these one-wire protocols is their very low data rate—limited to 16 Kb/s. It is expected that IoT sensors such as imagers triggered by environmental events (motion, chemical concentrations, temperature, etc.) will require much higher data rates for the transmission of information. Some applications transfer data in standard protocols such as the serial RS232-UART with data rate in the range of few Kb/s.

High-data-rate, single-wire communication can be achieved by encoding/decoding bits onto the cycles of a carrier waveform. To ensure transmission reliability, the carrier signal needs to have a high voltage amplitude (±15 V) thus requiring power conversion and other special circuitry. Line coding techniques, like Non Return to Zero, Manchester, Alternate Mark Inversion, etc., are bit-time dependent and require either a CDR for clock synchronization or a higher clock rate to sample the line to detect edges or to measure the time between edges. Another process is Universal Serial Bus (USB), which achieves high data rates but is known to be very power-hungry due to its complexity and to the need of an external controller to execute all the transfers. In general, digital systems operating at low clock rates (few MHz) and receiving serial data using a one-wire channel operating at a relatively high data rate will need a CDR to receive and recover data without errors. CDR circuits are typically significant consumers of energy on traditional single-channel communication protocols. As such, improved systems and methods for low-power single-wire communication are needed.

SUMMARY

Systems and methods for low-power single-wire communication are provided. In some embodiments, a method of operation of a transmitter to transmit a data word to a receiver using low-power single-wire communication includes receiving the data word to be transmitted to the receiver. The method also includes encoding the data word to be transmitted in a Pulsed Index Communication (PIC) format to produce a PIC data word and transmitting the PIC data word to the receiver. In this way, the transmitter may be able to transmit an increased amount of data while maintaining a simple communication protocol that uses low power and does not require a Clock-Data Recovery (CDR) circuit.

In some embodiments, encoding the data word to be transmitted in the PIC format to produce the PIC data word includes determining a set of ON indexes which are the indexes of the data word that contain a logical True value and generating a number of pulses corresponding to the value of the index for each index in the set of ON indexes to produce the PIC data word.

In some embodiments, encoding the data word to be transmitted in the PIC format to produce the PIC data word includes determining whether to invert the ON indexes in the data word prior to determining the set of ON indexes which are the indexes of the data word that contain a logical True value. In some embodiments, determining whether to invert the ON indexes in the data word includes determining that inverting the ON indexes in the data word results in fewer pulses to transmit than if the data word were not inverted.

In some embodiments, encoding the data word to be transmitted in the PIC format to produce the PIC data word includes determining whether to reverse the ON indexes in the data word prior to determining the set of ON indexes which are the indexes of the data word that contain a logical True value. In some embodiments, determining whether to reverse the ON indexes in the data word includes determining that reversing the ON indexes in the data word results in fewer pulses to transmit than if the data word were not inverted.

In some embodiments, transmitting the PIC data word to the receiver also includes transmitting a flag to the receiver that indicates at least one of: the data word is inverted, the data word is not inverted, the data word is revered, and/or the data word is not reversed. In some embodiments, transmitting a number of pulses that indicates a value of the flag that indicates at least one of the: the data word is inverted, the data word is not inverted, the data word is revered, and/or the data word is not reversed.

In some embodiments, a method of operation of a receiver to receive a data word from a transmitter using low-power single-wire communication includes receiving a PIC data word from the transmitter and decoding the PIC data word using a PIC format to produce a data word.

In some embodiments, decoding the PIC data word received in the PIC format to produce the data word includes determining a number of pulses corresponding to a value of an index for each index in a set of ON indexes to produce the data word.

In some embodiments, decoding the PIC data word received in the PIC format to produce the data word also includes determining whether to invert the ON indexes to produce the data word. In some embodiments, determining whether to invert the ON indexes in the data word includes determining that inverting the ON indexes in the data word results in fewer pulses than if the data word were not inverted.

In some embodiments, decoding the PIC data word received in the PIC format to produce the data word also includes determining whether to reverse the ON indexes to produce the data word. In some embodiments, determining whether to reverse the ON indexes in the data word includes determining that reversing the ON indexes in the data word results in fewer pulses than if the data word were not inverted.

In some embodiments, receiving the PIC data word from the transmitter also includes receiving a flag from the transmitter that indicates at least one of: the data word is inverted, the data word is not inverted, the data word is revered, and/or the data word is not reversed. In some embodiments, receiving the flag from the transmitter includes receiving a number of pulses that indicates a value of the flag that indicates at least one of: the data word is inverted, the data word is not inverted, the data word is revered, and/or the data word is not reversed.

In some embodiments, a transmitter for transmitting a data word to a receiver using low-power single-wire communication includes at least one processor and memory. The memory includes instructions executable by the at least one processor whereby the transmitter is operable to receive the data word to be transmitted to the receiver; encode the data word to be transmitted in a PIC format to produce a PIC data word; and transmit the PIC data word to the receiver.

In some embodiments, the transmitter is also operable to determine a set of ON indexes which are the indexes of the data word that contain a logical True value and generate a number of pulses corresponding to the value of the index for each index in the set of ON indexes to produce the PIC data word.

In some embodiments, the transmitter is also operable to determine whether to invert the ON indexes in the data word prior to determining the set of ON indexes which are the indexes of the data word that contain a logical True value.

In some embodiments, the transmitter is also operable to determine whether to reverse the ON indexes in the data word prior to determining the set of ON indexes which are the indexes of the data word that contain a logical True value.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 2A and 2B illustrate selection of ON bits and the problem of a large number of pulses;

FIG. 6 illustrates an exemplary mapping of the flags to whether a block is inverted or reversed according to some embodiments of the present disclosure;

FIGS. 12A through 12C illustrate exemplary transmission, reception, and encoding formats according to some embodiments of the present disclosure;

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Typical networks use a single-wire protocol that does not require any Clock and Data Recovery (CDR) circuit. These devices are powered using the charge of a capacitor and their power requirements are quite minimal. The networks using this architecture are called Microlans and have been applied in a variety of sensor applications. The main disadvantage of these one-wire protocols is their very low data rate-limited to 16 Kb/s. It is expected that IoT sensors such as imagers triggered by environmental events (motion, chemical concentrations, temperature, etc.) will require much higher data rates for the transmission of information. Some applications transfer data in standard protocols such as the serial RS232-UART with data rate in the range of few Kb/s.

High-data-rate, single-wire communication can be achieved by encoding/decoding bits onto the cycles of a carrier waveform. To ensure transmission reliability, the carrier signal needs to have a high voltage amplitude (±15 V) thus requiring power conversion and other special circuitry. Line coding techniques, like Non Return to Zero, Manchester, Alternate Mark Inversion, etc., are bit-time dependent and require either a CDR for clock synchronization or a higher clock rate to sample the line to detect edges or to measure the time between edges. Another process is Universal Serial Bus (USB) that achieves high data rates but is known to be very power-hungry due to its complexity and to the need of an external controller to execute all the transfers. In general, digital systems operating at low clock rates (few MHz) and receiving serial data using a one-wire channel operating at a relatively high data rate will need a CDR to receive and recover data without errors. CDR circuits are typically significant consumers of energy on traditional single-channel communication protocols. As such, improved systems and methods for low-power single-wire communication are needed.

Figure 1:
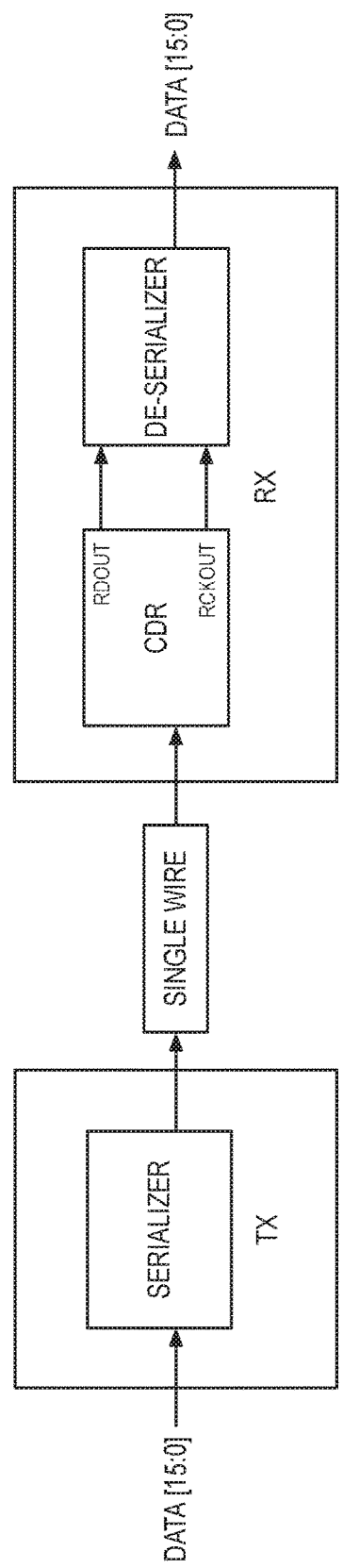
FIG. 1 illustrates a single-wire data transfer.

FIG. 1 illustrates a single-wire data transfer. The block diagram in FIG. 1 shows the typical orientation of the CDR in relation to the Serializer-Deserializer (SERDES) of the communication channel. As shown, the data word enters the serializer in the transmitter and it is transmitted over the single-wire. The receiver first routes the signal through the CDR circuit to recover the clock and data signal. Once this synchronization has occurred, the data is sent to the deserializer which produces the output data word. As used herein, the term "data word" refers to any string of bits and does not impose a specific structure or length on the bits. In FIG. 1, the data word is sixteen bits long with indexes fifteen through zero. However, the embodiments discussed herein are not limited thereto.

Some embodiments disclosed herein relate to a signaling method for data transfer over a single-wire achieving high data rates (in the MHz range), with low power consumption and small footprint. In some embodiments, the method does not require a CDR circuit. Further, a device using this method operated with signals at low amplitude voltage (~1V), uses simple encoding and decoding schemes, and tolerates clocking differences between transmitter and receiver. The method, denoted Pulsed Index Communication (PIC), transfers the indices of only the ON bits as a series of pulses. Using a very compact packet header, information is provided about the number of such indices and the encoding operations to which the raw bits have been subjected. When the pulses are received, the receiver applies the appropriate decoding to infer the original data bits. PIC is dynamic in that it accommodates several data rates in the range of 3.1-8.5 Mb/s with an average of 4.1 Mb/s using a 24-MHz clock. Pulsed Index Communication utilizes edge detection of incoming pulses to provide remarkable robustness with respect to jitters, skews, and clock inaccuracies between the transmitter and receiver, significantly reducing error rates. In another embodiment, PIC is used as both a transmitter and a receiver. Yet another feature is that PIC is architecturally flexible and configured according to the signaling topology (Master-Slave, Ring, Star etc.).

Systems and methods for low-power single-wire communication are provided. In some embodiments, a method of operation of a transmitter to transmit a data word to a receiver using low-power single-wire communication includes receiving the data word to be transmitted to the receiver. The method also includes encoding the data word to be transmitted in a PIC format to produce a PIC data word and transmitting the PIC data word to the receiver. In this way, the transmitter may be able to transmit an increased amount of data while maintaining a simple communication protocol that uses low power and does not require a CDR circuit.

FIGS. 2A and 2B illustrate selection of ON bits and the problem of a large number of pulses. In this embodiment, PIC transmits 2, 3, and 7 which are the index numbers of the ON bits rather than transmitting all the ON and OFF bits. Each index was sent in the form of i consecutive pulses where i is the index number (i.e. i=2, 3, and 7). In this embodiment, each index's stream of pulses is followed by a delay of 4 clock cycles, as explained below.

If all are 16-bit data and all of the bits are 1 then it would generate a large number of pulses to send. As illustrated in FIG. 2B, all the indices from 0 to 15 need to be sent. The pulses would increase exponentially as the number of data bits increases. This approach is unacceptable as it may significantly reduce the data rate.

Figure 3:
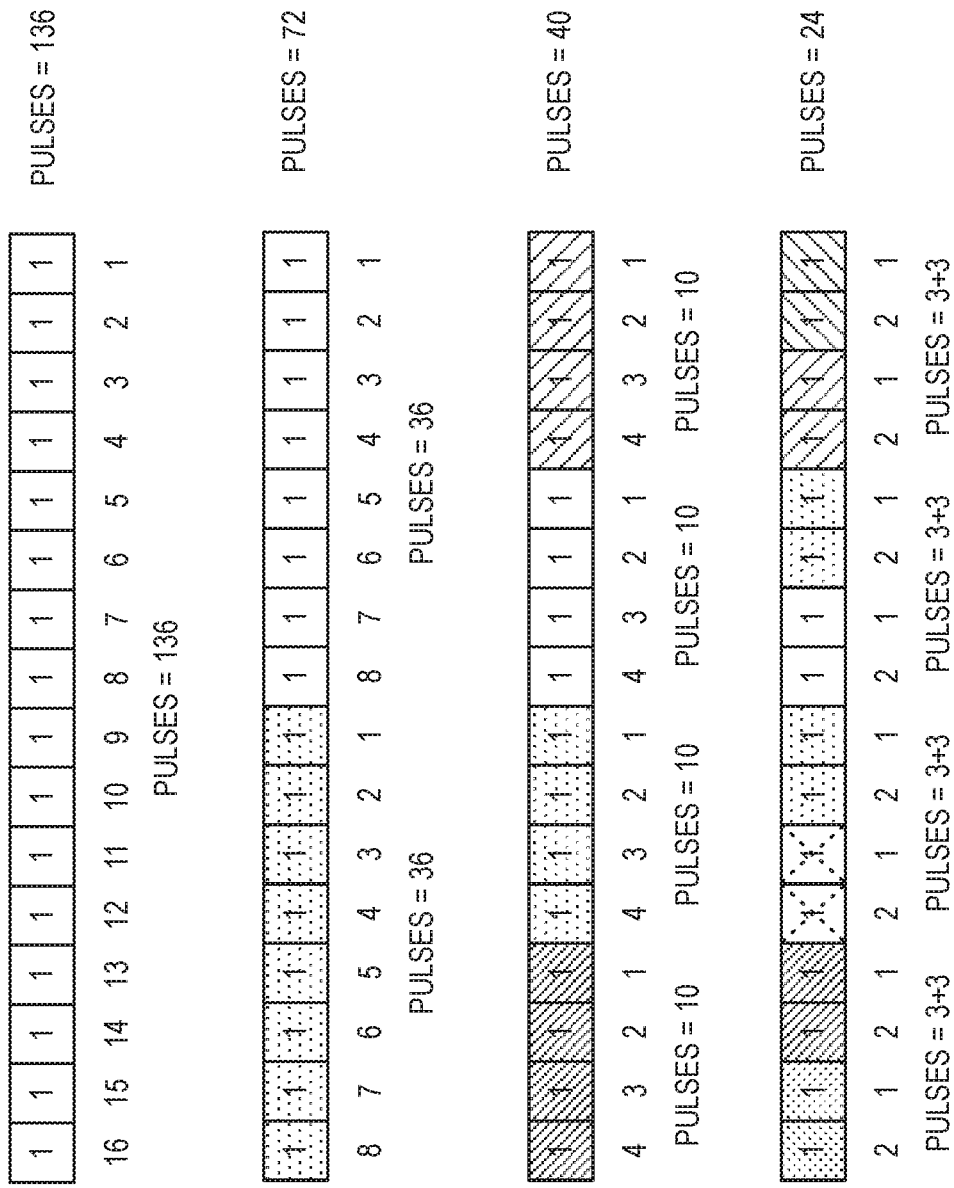
FIG. 3 illustrates different ways that a block can be segmented according to some embodiments of the present disclosure.

FIG. 3 illustrates different ways that a block can be segmented according to some embodiments of the present disclosure. The number of transmitted pulses decreases quickly if the indices of the ON bits are small. This is achieved by introducing data segmentation in which the data is broken into small segments of equal size. Considering all the segments as distinct data words significantly lowers the index values. The segmentation process and the resulting indices are shown in FIG. 3 for 16-bit worst-case data in which all the bits are ON. If there is no segmentation, this results in 136 pulses. If segmented into chunks of 8 bits, 72 pulses are needed. If segmented into chunks of 4 bits, 40 pulses are needed. If segmented into chunks of 2 bits, only 24 pulses are needed.

Figure 4:
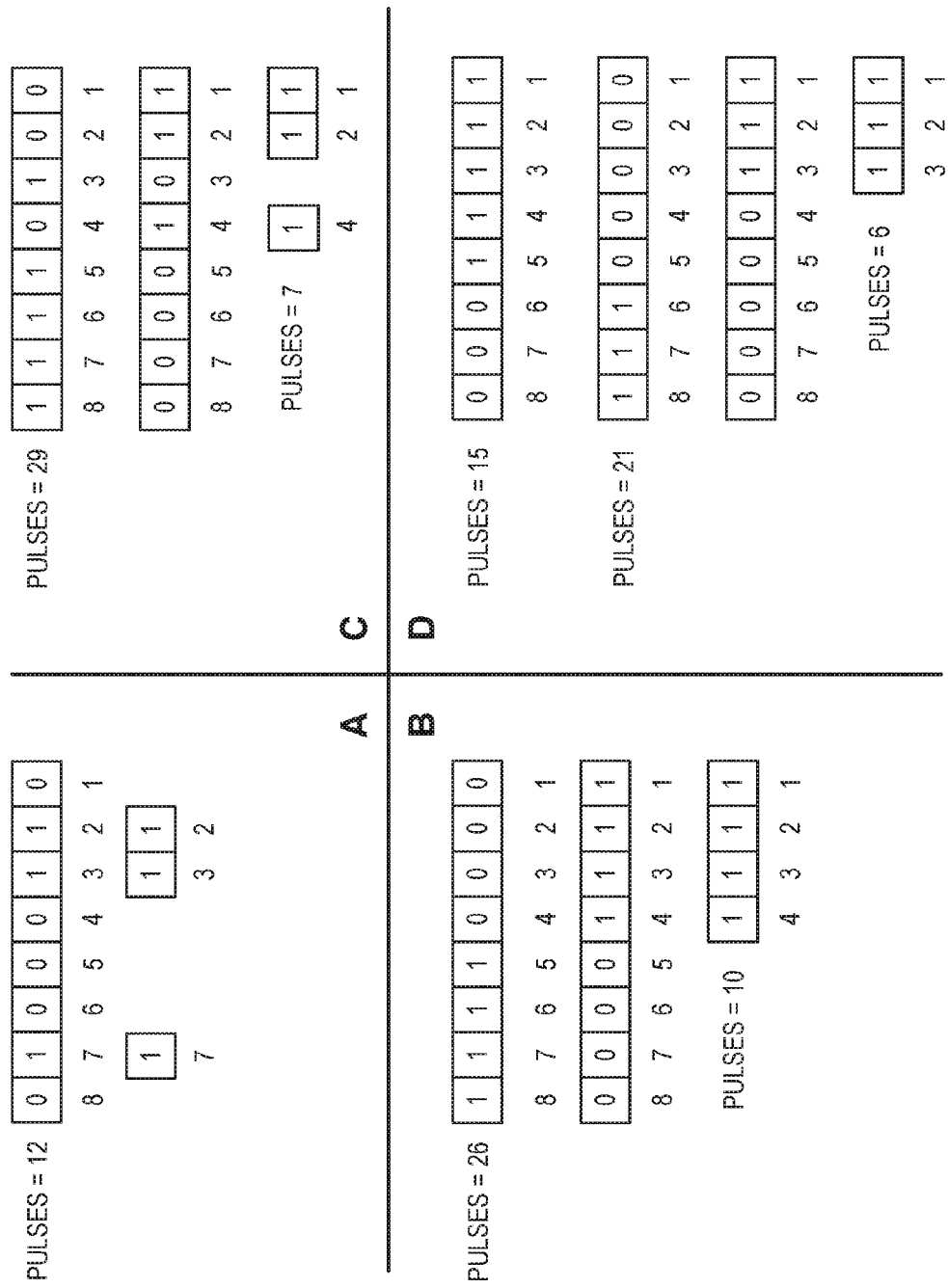
FIG. 4 illustrates different encodings with different combinations of inversions and reversals according to some embodiments of the present disclosure.

FIG. 4 illustrates different encodings with different combinations of inversions and reversals according to some embodiments of the present disclosure. By reducing the number of ON bits, the number of indices is reduced and amount needed to be transmitted. In turn, there is a coordinate decrease of the total pulse count. Further reduction can be obtained if the ON bits, within each segment, are mapped to locations with small index numbers. In these embodiments, reductions can be achieved using bitwise inversion and segment-wise reversal. Bitwise inversion is a conditional one's complement operation on the segment bits. The bitwise condition being that more than half of the length of the segment is occupied by ON bits. Reversal is a conditional right-left flipping operation. The reversal condition being that the decimal value of the segment bits after flipping is less than its decimal value before flipping. FIG. 4 illustrates the application of inversion and reversal on a 8-bit data word where:

(a) no reversal or inversion;
(b) reversal;
(c) inversion; and
(d) both reversal and inversion.

Interesting, in some embodiments, inversion and reversal alone cannot minimize the number of pulses. Surprising, combining inversion and reversal resulted in the smallest number of pulses, namely 6, in these examples. One's complement and flipping on short data words are not only very easy to implement in hardware but also very easy to invert (they are both idempotent operations). The latter property is very important for energy-efficient decoding. In some embodiments, energy-efficient synthesis of these encoding/decoding procedures is implemented in both Field Programmable Gate Arrays (FPGA) (Xilinx Virtex VII) and Application Specific Integrated Circuits (ASIC) (GLOBAL FOUNDRIES 65 nm).

Figure 5:
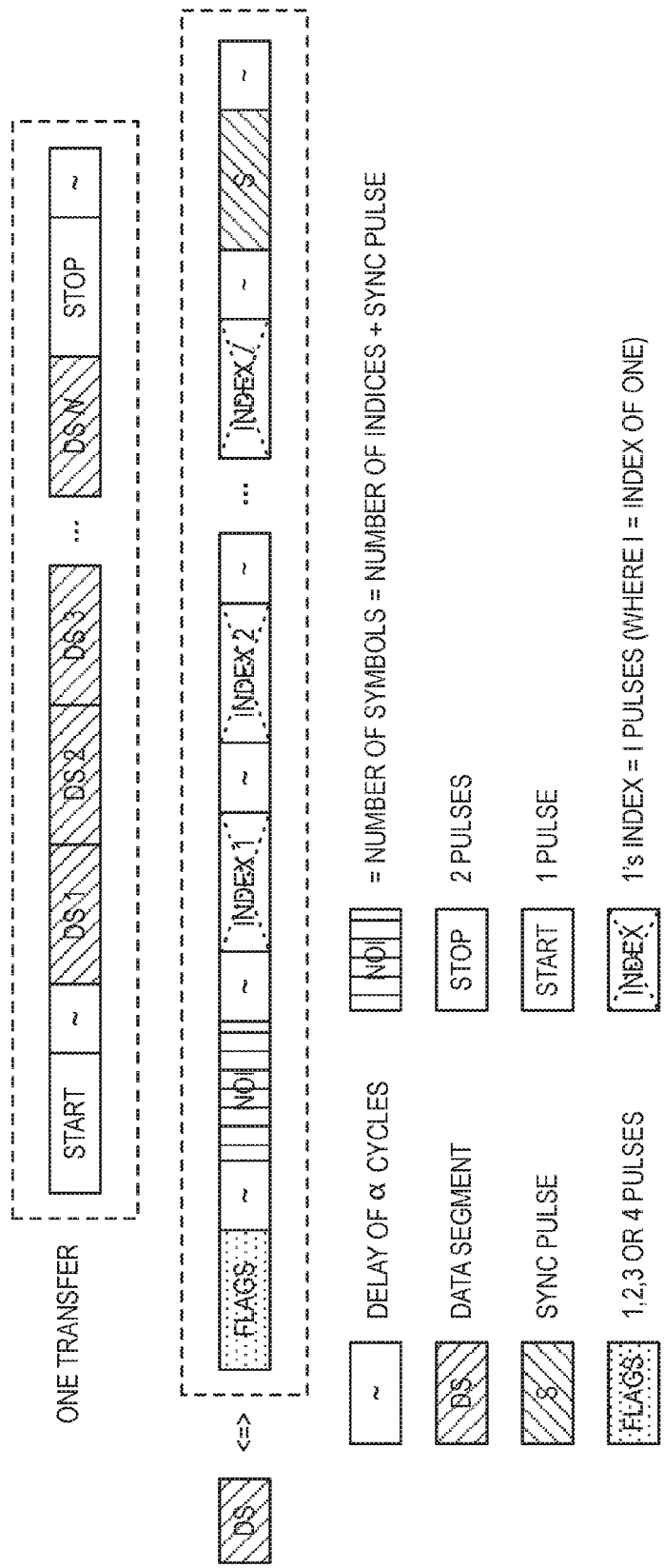
FIG. 5 illustrates an exemplary transmission format reversals according to some embodiments of the present disclosure.

FIG. 5 illustrates an exemplary transmission format according to some embodiments of the present disclosure. In another embodiment, a serializer process is used to collect the encoded data from the encoder and transmit it serially according to the specific format shown in FIG. 5. Each segment is transmitted along with a header, including encoding "Flags" and the Number of Indices (NOI). In this embodiment, the body of the message includes the index pulses and a synch pulse.

As shown in FIG. 5, one transfer can be composed of a start (e.g., 1 pulse) followed by a delay of a cycles and then the N data segments. Each data segment can be further broken down into a flags section that indicates whether the data has been inverted or reversed. This is followed by more delay and the indication of the number of symbols or indices that will be transmitted in this data segment. Then each index is transmitted with delay in between.

FIG. 6 illustrates an exemplary mapping of the flags to whether a block is inverted or reversed according to some embodiments of the present disclosure. Flags is a 2-bit code representing one of the 4 encoding cases including no reversal or inversion; only reversal; only inversion; and both reversal and inversion. NOI represents the number of indices being transmitted. Each of these parts is sent in the form of a pulse stream (one pulse is equal to 1 clock cycle) and each stream is followed by a boundary tag made of 4 clock cycles. Transmission is initiated with a start pulse followed by all the message pulses and it ends with two stop pulses. There is a boundary tag of 4 clock cycles after the start and stop pulses.

The receiver counts the pulses of each stream using rising edge detection which entirely eliminates the need of CDR. The count of NOI pulses reveals the number of indices of the ON bits being received while the flag count is used to infer the segment encoding which will be used in the segment decoding process. The decoded segments are combined to assemble the full length of transmitted data.

To model, analyze, and optimize the encoding/decoding procedure of segmentation, inversion, and reversal, the i-th bit in the s-th segment is denoted by $b^s_i$, where I is the number of bits per segment and N is the number of segments. In the following set of 5 equations, the last of which gives the data rate R of the PIC protocol for a clock period of T and total pulse count of C.

Equations:

$$P_s = \sum_{i=0}^{l-1} (i+1) b^s_i \quad (1)$$

$$n_s = \sum_{i=0}^{l-1} b^s_i \quad (2)$$

$$C_s = 2 + f_s + 3\alpha + (1+\alpha) n_s + P_s \quad (3)$$

$$C = 2N + 3 + (3N+2)\alpha + \sum_{s=1}^{N} f_s + (1+\alpha) \sum_{s=1}^{N} n_s + \sum_{s=1}^{N} P_s \quad (4)$$

$$R = \frac{lN}{TC} \quad (5)$$

Where $\alpha$ is the tag delay, $P_s$ is the number of pulses required for the ON bits, $n_s$ is the number of ON-bits, $C_s$ is the total cycles count, and $f_s$ is the flags' pulse count, all in reference to segment s.

The expression C in Equation 4 results from a summation over all segments in the data stream. The remainder of this section is devoted to showing how these equations have been used to analyze and optimize the PIC protocol for maximum data rate transmission.

Figure 7:
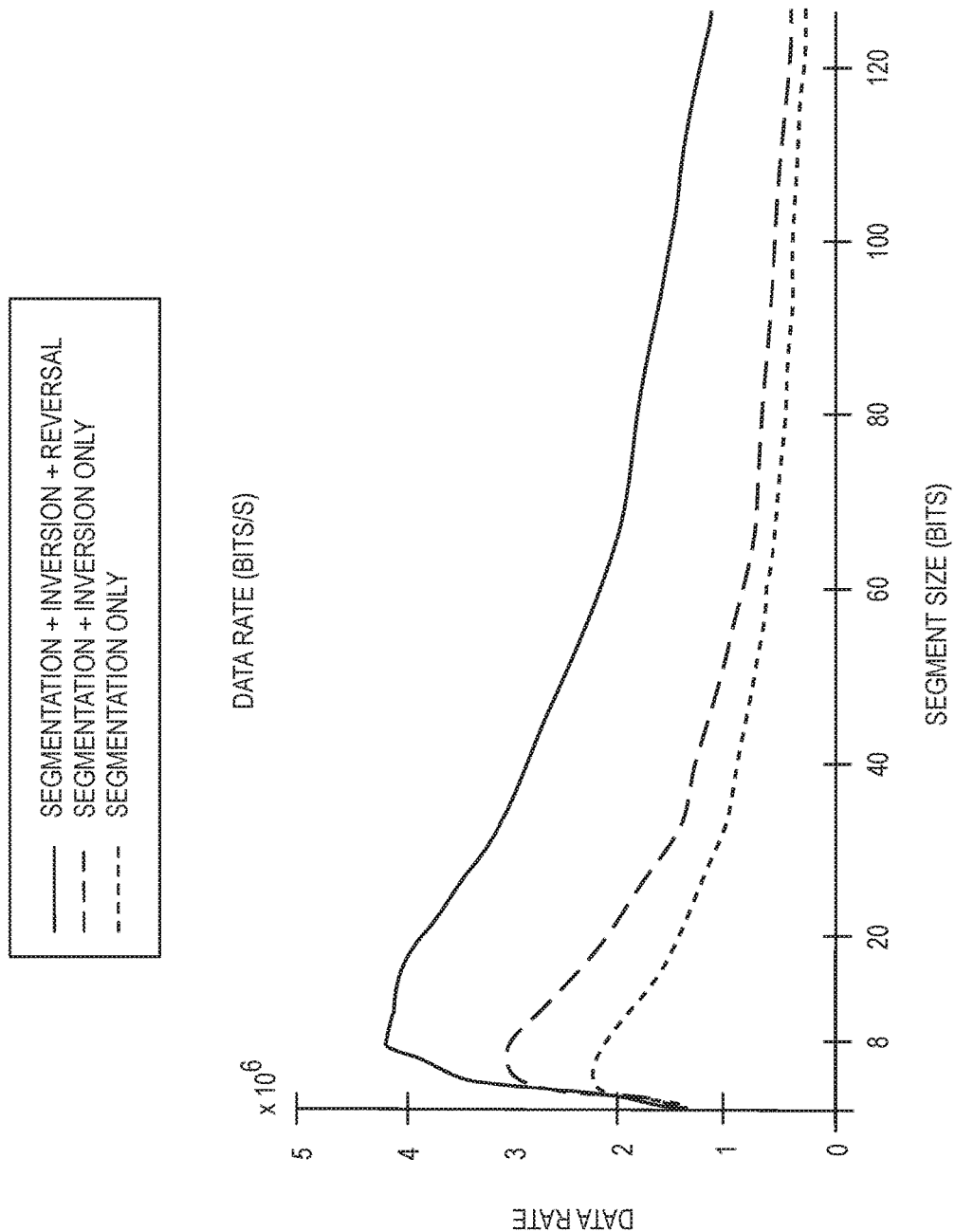
FIG. 7 illustrates an analysis of an optimum segment size according to some embodiments of the present disclosure.

FIG. 7 illustrates an analysis of an optimum segment size according to some embodiments of the present disclosure. In the next embodiment, the equations are used to optimize the segment size. Specifically, the segment size is chosen to maximize data rate. For a small segment, delays inserted between pulse streams to separate symbols reduce the data rate. Similarly for large segments, ON bits with high indices require a large number of pulses to be transmitted, which in turn reduces the data rate. It is therefore demonstrated in FIG. 7 that there is a segment size for which the data rate is maximum. As illustrated, the data rate was plotted as function of the segment size for the three cases where the three levels of encoding are applied to the raw data. For this particular example, the plot shows that the data rate is maximized when the number of bits per segment is 8. However, this segment-length optimization can be made mathematically rigorous using a constrained optimization formulation based on Equations 1 through 5.

Figure 8:
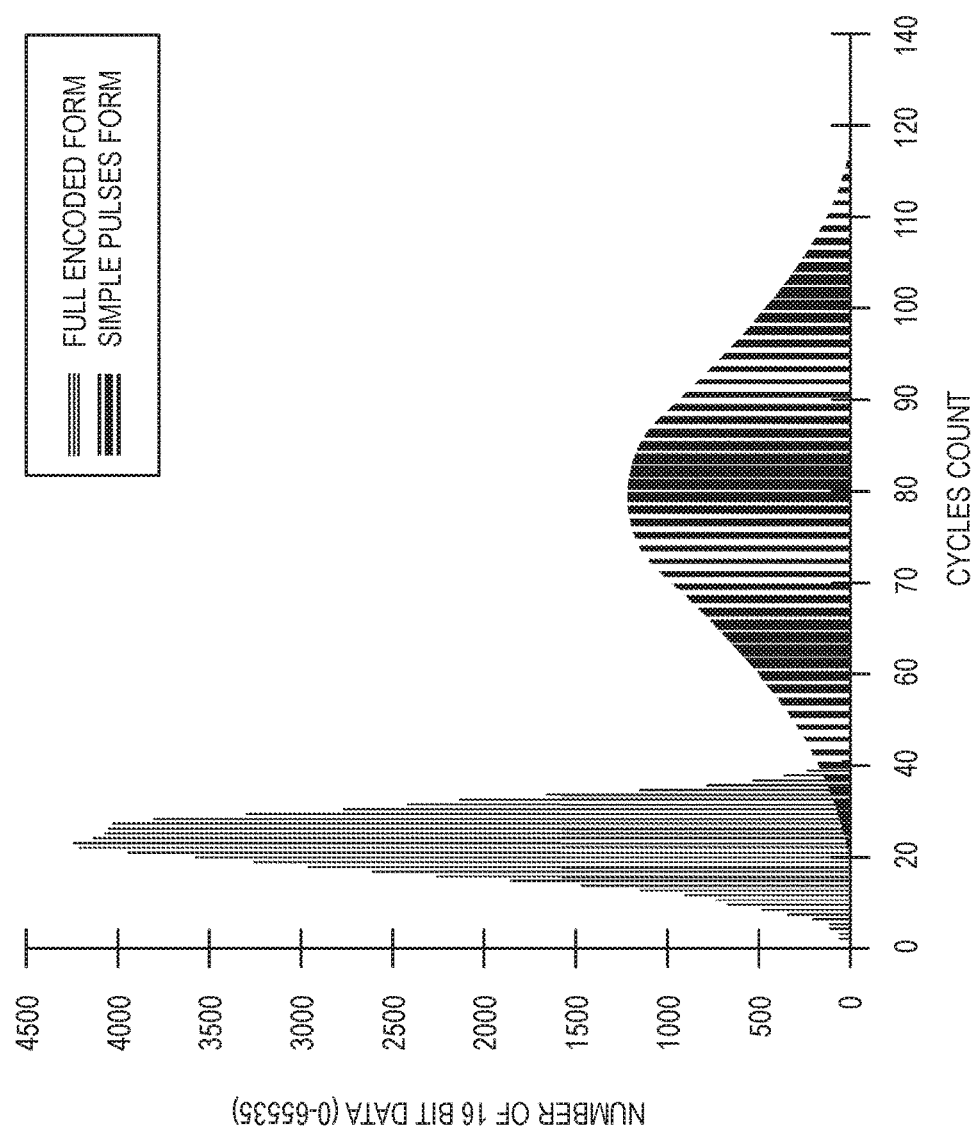
FIG. 8 illustrates an analysis of the cycles needed per pulse count according to some embodiments of the present disclosure.

FIG. 8 illustrates an analysis of the cycles needed per pulse count according to some embodiments of the present disclosure. The PIC is dynamic in that the actual data rate of the process is dictated by the count, which is very much data dependent, shown by Equations 4 and 5. The statistical distribution of PIC data rates was shown by using exhaustive sampling of 16-bit data words (216-1 PRBS), with each segmented into two 8-bit segments. For data rate calculations, a 24 MHz clock was used. These analyses showed that the full encoding process (Segmentation+Inversion+Reversal) is generally needed to maximize the (average) data rate but provided a tighter distribution of dynamic rates around the average data rate. For each data word, both the raw pulse count (no encoding) and the pulse count was computed that has resulted from full encoding. The histograms of pulse counts are shown in FIG. 8.

Figure 9:
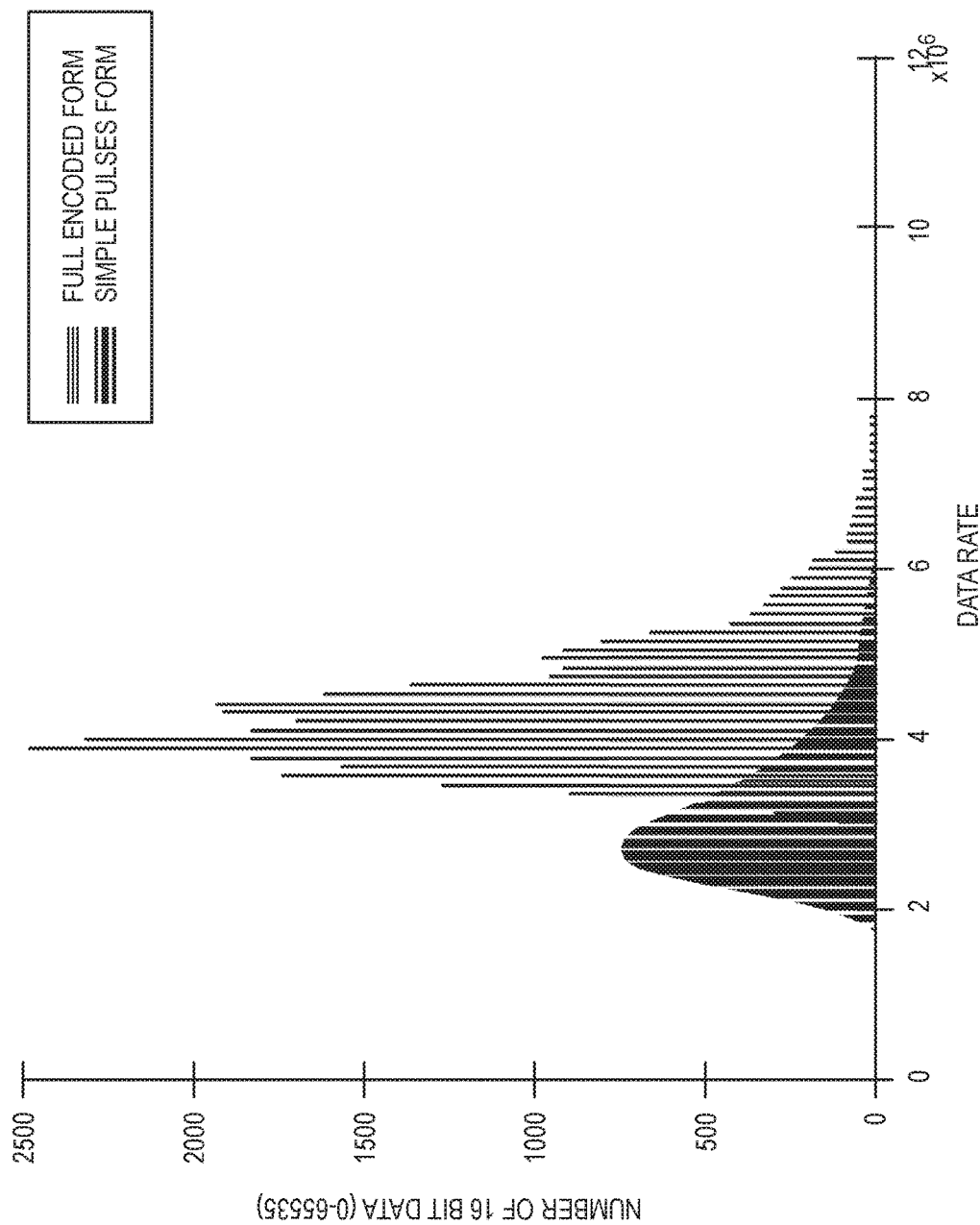
FIG. 9 illustrates an analysis of the data rate according to some embodiments of the present disclosure.

FIG. 9 illustrates an analysis of the data rate according to some embodiments of the present disclosure. After full encoding, there is a significant reduction in the average number of pulse counts and a tightening of the pulse count distributions around the average. The histograms of data rates are shown in FIG. 9. Comparing the two histograms, there is an increase in the average data rate and a tightening of the data rate distribution around the average.

Figure 10:
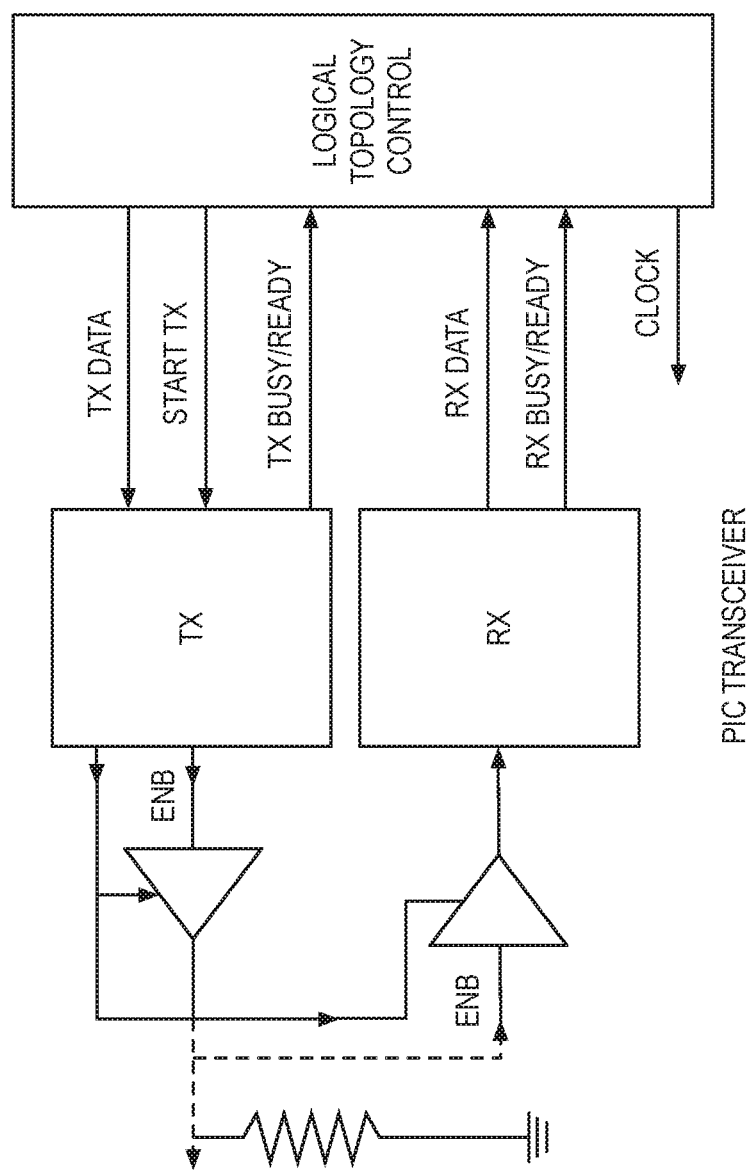
FIG. 10 illustrates one side of a Pulsed Index Communication (PIC) transmission system according to some embodiments of the present disclosure.

FIG. 10 illustrates one side of a Pulsed Index Communication (PIC) transmission system according to some embodiments of the present disclosure. Both ends of the system comprise the same transceiver along with its Logical Topology Control (LTC) unit. The LTC can be used to implement a variety of transmission topologies (one-to-one, master-slave, ring, etc.) without any change in the underlying PIC encoding/decoding. This is because the PIC transceiver operates on raw bits and does not distinguish between data types (e.g., slave ID vs. data packet).

Figure 11:
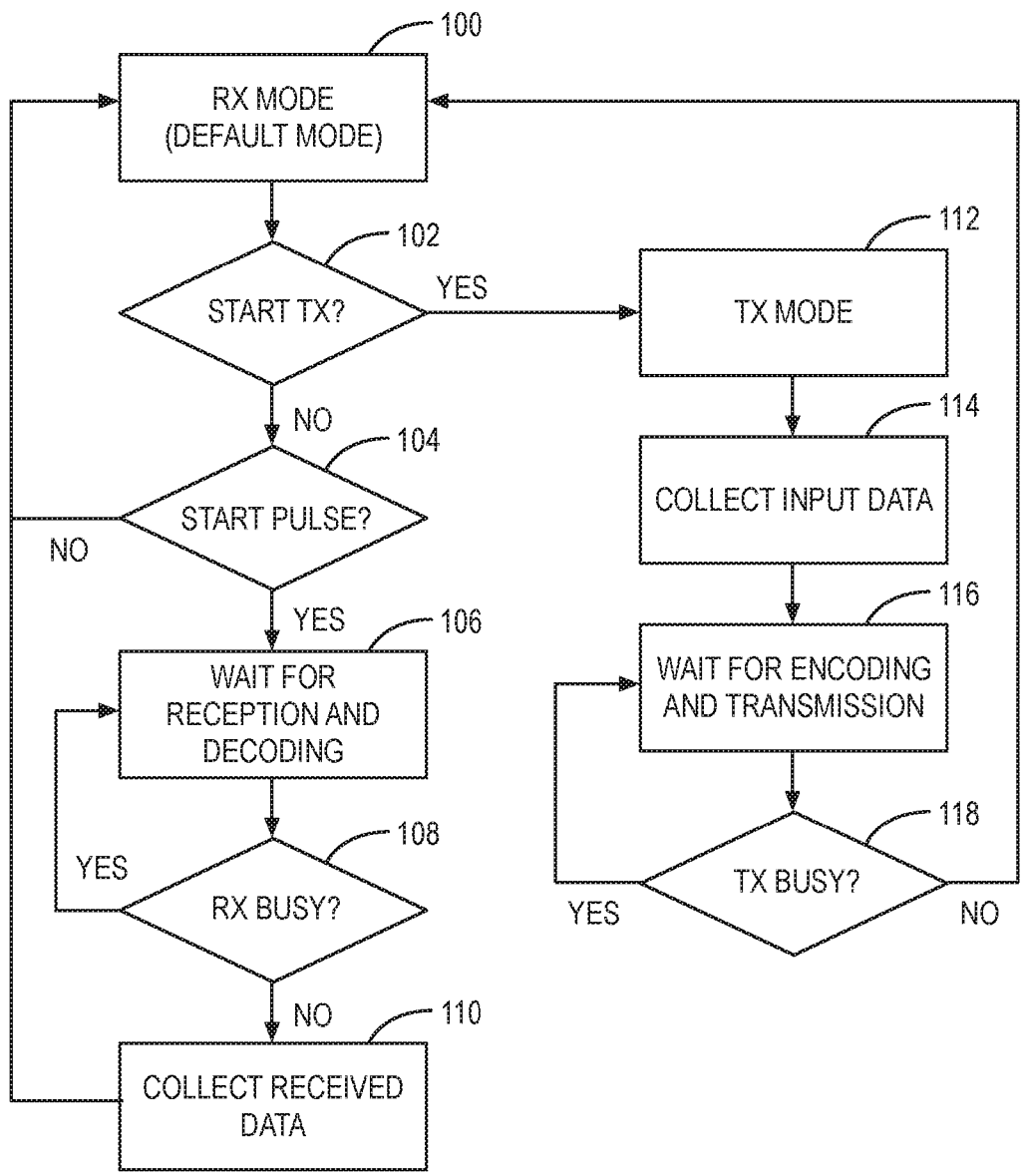
FIG. 11 illustrates an exemplary flow chart for a PIC transceiver according to some embodiments of the present disclosure.

FIG. 11 illustrates an exemplary flow chart for a PIC transceiver according to some embodiments of the present disclosure. RX is the default transceiver mode (step 100). If the transceiver is not supposed to start a transmission (step 102), then the transceiver determines whether it has received the start of a pulse (step 104). If a pulse has started, then the transceiver waits for reception and decoding (step 106). If no pulse has started, the transceiver returns to step 100. While receiving a decoding, the transceiver monitors whether the receiver is busy (step 108). If it is still busy, the transceiver loops around waiting for the receiver to no longer be busy. At that point, the transceiver collects the received data (step 110).

If in step 102 the transceiver determines that it should transmit, then the transmitter enters transmit mode, perhaps on LTC request (step 112). The transceiver collects input data to be transmitted (step 114). Then the transceiver waits for encoding and transmission (step 116). If the transmitter is still busy (step 118), then the transceiver loops around until the transmission is complete. Then the transceiver returns to the default mode at step 100.

FIGS. 12A through 12C illustrate exemplary transmission, reception, and encoding formats according to some embodiments of the present disclosure. Tristate buffers are used to control line access. TX leaves the line in high-impedance state after transmission is completed. The external pull-down technique is used to keep the line low in idle states.

To verify PIC's functionality and performance, a prototype setup based on a Virtex-7 development board was utilized. All the blocks in FIGS. 2-10 were implemented in Verilog hardware description language and tested on FPGA. Extensive simulations and real time hardware verification were performed in order to verify the results.

Two different implementations and their verifications are carried out and compared. In the first implementation, the data is sent in a simple serial bit stream of 1's and 0's without any encoding. In the second implementation, PIC is utilized to encode and serialize the data. 16-bit data words were used, 2 segments per word at a clock rate of 25 MHz. The transmitter sends the 16-bit data starting at 0 with an increment of 1 at each transmission. The receiver resends the same data back. The returned and original data words are compared to verify the complete round-trip chain. The number of perfect matches was logged.

Along the FPGA prototype, the PIC system was synthesized and verified using a Synopsis logic-synthesis flow and a GLOBALFOUNDROES 65 nm process in order to have realistic area and power estimates. Table I summarizes the compared data rates of few single-wire transmission techniques. It is clear that PIC outperforms prior techniques without any CDR or power conversion circuitry and with tolerance towards jitters, skew and clock inaccuracies.

TABLE I

Data Rate Comparison of One Wire Techniques

|  | PIC | 1-Wire [1] | [10] | [11] |
|---|---|---|---|---|
| Data Rate | 3.1-8.5 Mb/s (Avg. 4.1 Mb/s) | 16 Kb/s | 38.4 Kb/s | 67 Kb/s |

In Table II, PIC is compared with the normal serial transmission (NST), including CDR, in terms of area and power. In the present embodiments, PIC did not require CDR to recover data successfully while NST required CDR. The PIC based process resulted in a significant decrease in area and power. For smaller footprint applications (wireless sensor nodes, wearable computing, body-area networks, etc.) PIC is definitely the better choice. As for power, CDR is the main source of power consumption, and even if low-power CDR's proposed is used, PIC still outperforms NST with low-power CDR since:

$$P_{NST\text{-}SRL} + P_{CDR} > P_{PIC} \quad (6)$$

As mentioned above, to get the most realistic comparison with published literature, the systems have synthesized the PIC system using GLOBALFOUNDRIES 65 nm technology and found out that PIC consumes 26.6 μW with a gate count of 2356, offering dynamic data rates in the range of 3.1-8.5 Mbls (4.1 Mb/s average) with a 24-MHz clock. Compared with NST serialization and CDR, PIC can reduce area by more than 80% and power by more than 70%.

TABLE II

PIC Comparison with Simple-Serial

| | Power (uW) | | | Area (gate count) | | | |
|---|---|---|---|---|---|---|---|
| | SRL[a] | CDR | Total[d] (PI[e]) | SRL | CDR[c] | Total[d] (PI[e]) | Process |
| PIC | 26.6 | N/A | 26.6 | 2356 | N/A | 2356 | 65 nm |
| NST[b] | 32.1 | 70 | 102.1 (74%) | 1327 | 1560 | 16927 (86%) | 90 nm [12] |
| | 62.5 | | 94.6 (72%) | 6000 | 0 | 61327 (96%) | 90 nm [13] |
| | 90 | | 122.1 (78%) | N/A | | N/A | 90 nm [14] |
| | 57.5 | | 89.6 (70%) | 1980 | 0 | 21127 (89%) | 65 nm [15] |
| | 60.6 | | 92.7 (71%) | N/A | | N/A | 28 nm [16] |

Where a is Serializer; b is Normal Serial Transfer; c is Estimated calculation; d is SRL+CDR; and e is % Increase as compared to PIC.

Figure 13:
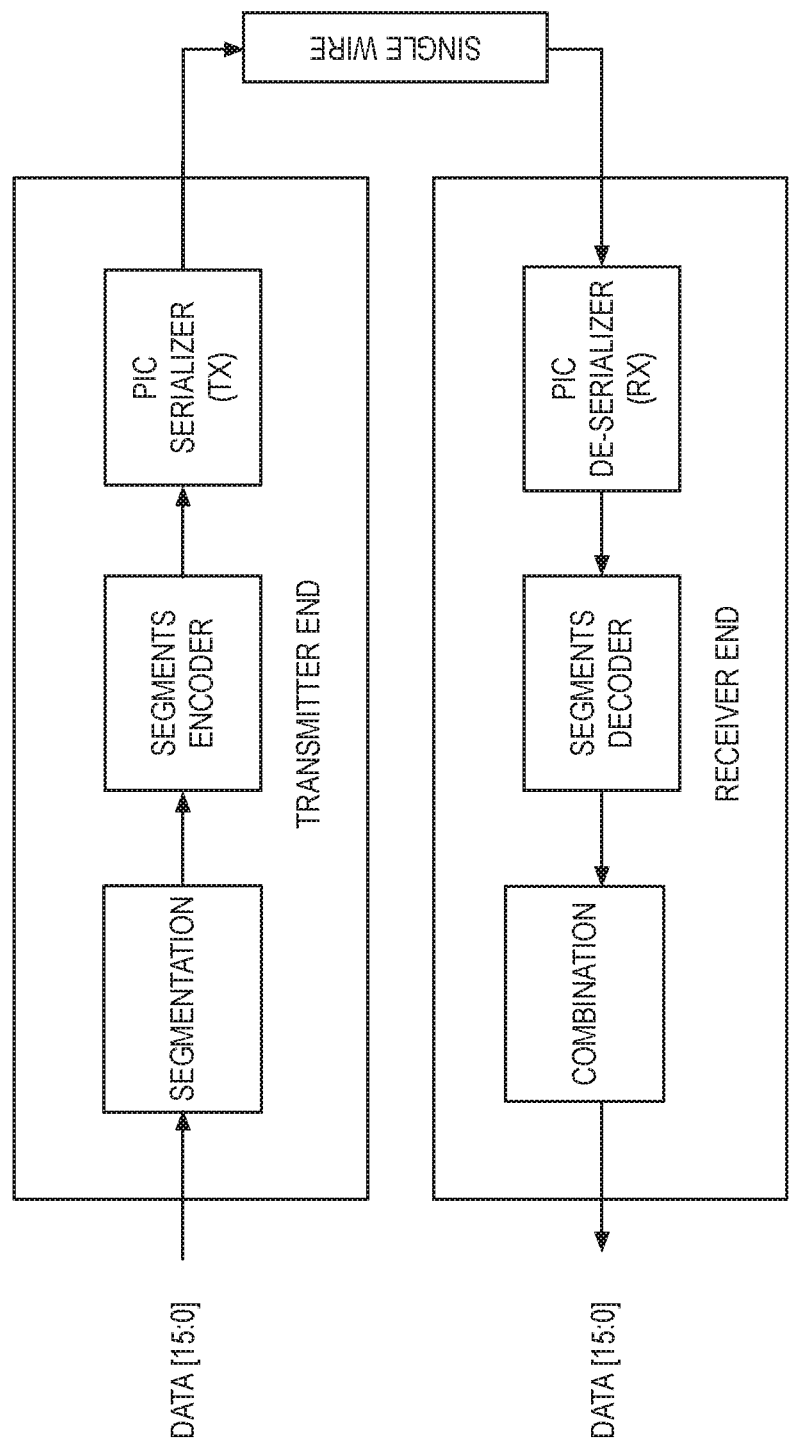
FIG. 13 illustrates a PIC transmission and reception system according to some embodiments of the present disclosure.

FIG. 13 illustrates a PIC transmission and reception system according to some embodiments of the present disclosure. The proposed PIC transfers data on one wire only without any additional wires except ground. In some embodiments, the method of PIC is to transfer only the indices of the ON bits in the data stream while ignoring the OFF bits. The index is transferred as a series of pulses, as the name of the method implied. High-data rates are achieved by encoding the raw bit stream where the codeword contained a minimal number of ON bits to be functional and these ON bits occupy the lowest possible index positions. The entire PIC process consists of three encoding steps followed by three decoding. The encoding process comprised three operations: segmentation, inversion, and reversal. Similarly, the decoding process comprises three operations in reverse. The conceptual block diagram of the encoding and transmission process is shown in FIG. 13 for the both the transmitter and receiver end.

In this example, the transmitter end receives a data word to be transmitted. This data word is passed through a segmentation module that may dissect the data word. These segments enter a segments encoder which may include the inversion and reversal operations if appropriate. Then, the data is sent to the PIC serializer which transmits the pulses over the single-wire communication channel.

The receiver reverses the processes of the transmitter by first passing the pulses through a PIC de-serializer. These segments are then decoded based on how they were encoded at the transmitter. In some embodiments, a flags variable is sent to indicate this. Finally, the segments are combined into the original data word and the transmission is complete.

Figure 14:
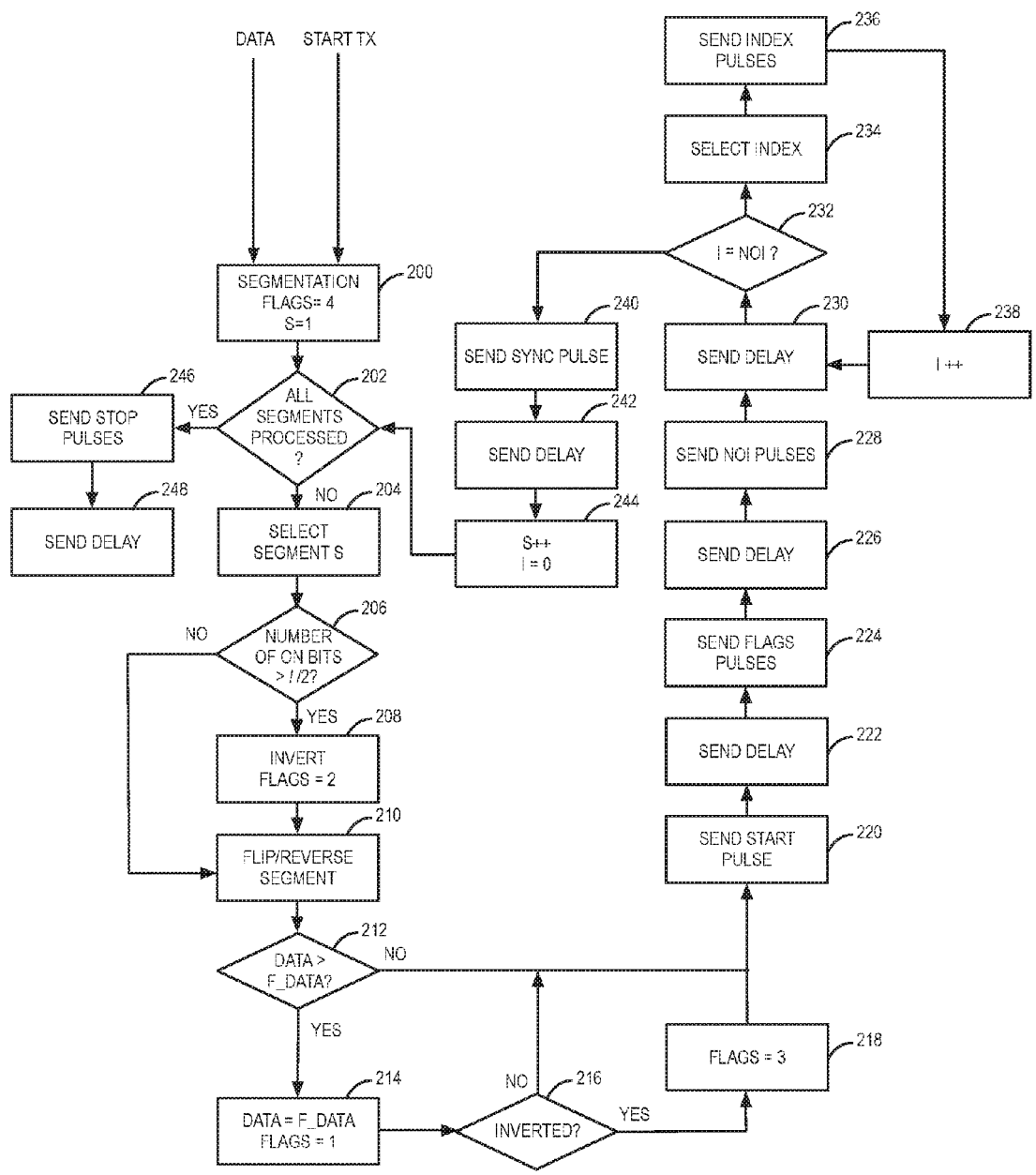
FIG. 14 illustrates an exemplary flow chart for a PIC transceiver according to some embodiments of the present disclosure.

FIG. 14 illustrates an exemplary flow chart for a PIC transceiver according to some embodiments of the present disclosure. However, other modifications of the scheme are also possible, such as to reverse and then invert, dependent upon the data stream received. As shown in FIG. 14, the transceiver first receives input data and an indication to start a transmission. The transceiver segments the input data and sets the flags to 4 and S to 1 (step 200). The transceiver checks if all segments have been processed (step 202) and continues to select the next segment if not (step 204).

If the number of bits is greater that I/2 (step 206), then the data is inverted and the flags are set to 2 (step 208). Next, the transceiver flips or reverses the segment (step 210). If the data is greater than the flipped data (step 212), then the data is set to the flipped data and the flags is set to 1 (step 214). If the data is also inverted (step 216), then flags are set to 3 (step 218).

The transceiver then sends the start pulse (step 220) and sends a delay (step 222). The transceiver sends the flags pulse (step 224) and again sends a delay (step 226). The transceiver sends the NOI pulses (step 228) and a delay (step 230). If I does not equal NOI (step 232) then the transceiver selects an index (step 234) and sends index pulses (step 236). The value of I is incremented (step 238).

If I is equal to NOI, then the transceiver sends the sync pulse (step 240) and a delay (step 242). The value of S is incremented to work with the next segment and I is reset to 0 (step 244). The procedure returns to step 202 to determine if all segments have been processed. If so, the transceiver sends stop pulses (step 246) and delay (step 248).

Those skilled in the art will recognize improvements and modifications to the preferred embodiments of the present disclosure. All such improvements and modifications are considered within the scope of the concepts disclosed herein and the claims that follow.

What is claimed is:

1. A method of operation of a transmitter to transmit a data word to a receiver using low-power single-wire communication, the method comprising:
   receiving the data word to be transmitted to the receiver;
   encoding the data word to be transmitted in a Pulsed Index Communication (PIC) format to produce a PIC data word, by:
      determining a set of ON indexes which are the indexes of the data word that contain a logical True value; and
      generating a number of pulses corresponding to a value of the index for each index in the set of ON indexes to produce the PIC data word; and
   transmitting the PIC data word to the receiver.

2. The method of claim 1 wherein encoding the data word to be transmitted in the PIC format to produce the PIC data word further comprises:
   determining whether to invert the ON indexes in the data word prior to determining the set of ON indexes which are the indexes of the data word that contain the logical True value.

3. The method of claim 2 wherein determining whether to invert the ON indexes in the data word comprises determining that inverting the ON indexes in the data word results in fewer pulses to transmit than if the data word were not inverted.

4. The method of claim 3 wherein encoding the data word to be transmitted in the PIC format to produce the PIC data word further comprises:
   determining whether to reverse the ON indexes in the data word prior to determining the set of ON indexes which are the indexes of the data word that contain the logical True value.

5. The method of claim 4 wherein determining whether to reverse the ON indexes in the data word comprises determining that reversing the ON indexes in the data word results in fewer pulses to transmit than if the data word were not inverted.

6. The method of claim 5 wherein transmitting the PIC data word to the receiver further comprises:
   transmitting a flag to the receiver that indicates at least one of the group comprising: the data word is inverted, the data word is not inverted, the data word is reversed, and the data word is not reversed.

7. The method of claim 6 wherein transmitting the flag to the receiver comprises:
   transmitting a number of pulses that indicates a value of the flag that indicates at least one of the group comprising: the data word is inverted, the data word is not inverted, the data word is reversed, and the data word is not reversed.

8. A method of operation of a receiver to receive a data word from a transmitter using low-power single-wire communication, the method comprising:
   receiving a Pulsed Index Communication (PIC) data word from the transmitter comprising a number of received pulses; and
   decoding the PIC data word using a PIC format to produce the data word, by:
      determining a value of an index for each index in a set of ON indexes from the number of received pulses; and
      producing the data word comprising a logical True value for each ON index of the set of ON indexes.

9. The method of claim 8 wherein decoding the PIC data word received in the PIC format to produce the data word further comprises:
   counting the number of received pulses using rising edge detection.

10. The method of claim 9 wherein decoding the PIC data word received in the PIC format to produce the data word further comprises:
    determining whether to invert the ON indexes to produce the data word.

11. The method of claim 10 wherein determining whether to invert the ON indexes in the data word comprises determining that inverting the ON indexes in the data word results in fewer pulses than if the data word were not inverted.

12. The method of claim 11 wherein decoding the PIC data word received in the PIC format to produce the data word further comprises:
    determining whether to reverse the ON indexes to produce the data word.

13. The method of claim 12 wherein determining whether to reverse the ON indexes in the data word comprises determining that reversing the ON indexes in the data word results in fewer pulses than if the data word were not inverted.

14. The method of claim 13 wherein receiving the PIC data word from the transmitter further comprises:
    receiving a flag from the transmitter that indicates at least one of the group comprising: the data word is inverted, the data word is not inverted, the data word is reversed, and the data word is not reversed.

15. The method of claim 14 wherein receiving the flag from the transmitter comprises:
    receiving a number of pulses that indicates a value of the flag that indicates at least one of the group comprising: the data word is inverted, the data word is not inverted, the data word is reversed, and the data word is not reversed.

16. A transmitter for transmitting a data word to a receiver using low-power single-wire communication, the transmitter comprising:
    at least one processor; and
    memory comprising instructions executable by the at least one processor whereby the transmitter is operable to:
       receive the data word to be transmitted to the receiver;
       encode the data word to be transmitted in a Pulsed Index Communication (PIC) format to produce a PIC data word by:
          determining a set of ON indexes which are the indexes of the data word that contain a logical True value; and generating a number of pulses corresponding to a value of the index for each index in the set of ON indexes to produce the PIC data word; and transmit the PIC data word to the receiver.

17. The transmitter of claim 16 wherein being operable to encode the data word to be transmitted in the PIC format to produce the PIC data word comprises the transmitter being further operable to:

determine whether to invert the ON indexes in the data word prior to determining the set of ON indexes which are the indexes of the data word that contain the logical True value.

18. The transmitter of claim 17 wherein being operable to encode the data word to be transmitted in the PIC format to produce the PIC data word comprises the transmitter being further operable to:

determine whether to reverse the ON indexes in the data word prior to determining the set of ON indexes which are the indexes of the data word that contain the logical True value.

* * * * *